United States Patent
Galvan et al.

(10) Patent No.: US 12,552,709 B2
(45) Date of Patent: *Feb. 17, 2026

(54) MIXTURES OF BITUMEN AND POLYMER COMPOSITIONS

(71) Applicant: BASELL POLIOLEFINE ITALIA S.R.L., Milan (IT)

(72) Inventors: Monica Galvan, Ferrara (IT); Claudio Cavalieri, Ferrara (IT); Gisella Biondini, Ferrara (IT); Vincent Baudier, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 699 days.

This patent is subject to a terminal disclaimer.

(21) Appl. No.: 17/916,426

(22) PCT Filed: Apr. 15, 2021

(86) PCT No.: PCT/EP2021/059828
§ 371 (c)(1),
(2) Date: Sep. 30, 2022

(87) PCT Pub. No.: WO2021/213896
PCT Pub. Date: Oct. 28, 2021

(65) Prior Publication Data
US 2023/0137178 A1 May 4, 2023

(30) Foreign Application Priority Data
Apr. 21, 2020 (EP) .................... 20170496

(51) Int. Cl.
*C04B 26/26* (2006.01)
*C04B 24/26* (2006.01)
*C04B 111/00* (2006.01)
*E01C 7/26* (2006.01)

(52) U.S. Cl.
CPC .......... *C04B 26/26* (2013.01); *C04B 24/2611* (2013.01); *C04B 24/2688* (2013.01); *E01C 7/265* (2013.01); *C04B 2111/00586* (2013.01)

(58) Field of Classification Search
CPC . C04B 26/26; C04B 24/2611; C04B 24/2688; C04B 2111/00586; E01C 7/265
See application file for complete search history.

(56) References Cited

U.S. PATENT DOCUMENTS 4,399,054 A    8/1983    Ferraris et al.

FOREIGN PATENT DOCUMENTS

| | | |
|---|---|---|
| EP | 0045977 A2 | 2/1982 |
| EP | 0361493 A1 | 4/1990 |
| EP | 0411627 A2 | 2/1991 |
| EP | 0592852 A1 | 4/1994 |
| EP | 0728769 A1 | 8/1996 |
| WO | 2009068371 A1 | 6/2009 |
| WO | 2016207235 A1 | 12/2016 |
| WO | 2016207236 A1 | 12/2016 |
| WO | 2017202600 A1 | 11/2017 |
| WO | 2020144102 A1 | 7/2020 |
| WO | 2020148105 A1 | 7/2020 |
| WO | 2020148106 A1 | 7/2020 |

OTHER PUBLICATIONS

The International Search Report and The Written Opinion for PCT/EP2021/059828 mailed Jun. 24, 2021 (Jun. 24, 2021).
M. L. Huggins, The Viscosity of Dilute Solutions of Long-Chain Molecules. IV. Dependence on Concentration, J. Am. Chem. Soc., vol. 64, 1942, p. 2716, XP002800218.
M. Kakugo et al., Carbon-13 NMR Determination of Monomer Sequence Distribution in Ethylene-Propylene Copolymers Prepared with Delta-Titanium Trichloride-Diethylaluminum Chloride, Macromolecules 1982, vol. 15, No. 4, pp. 1150-1152, American Chemical Society, Washington, DC, US, XP001172897, ISSN:0024-9297.
H. H. Karim et al., Effect of Modified Asphalt with SBS Polymer on Mechanical Properties of Recycled Pavement Mixture, Global Journal of Engineering Science and Research Management, Jul. 1, 2018, pp. 39-48, XP055727749, ISSN:2349-4506.

*Primary Examiner* — Catherine S Branch
*Assistant Examiner* — Andrea Wu

(57) ABSTRACT

A mixture made from or containing
T1) from 99 wt % to 75 wt % of bitumen, and
T2) from 1 wt % to 25 wt % of a polymer composition made from or containing
A) 5-35% by weight of a propylene ethylene copolymer;
B) 20-50% by weight of an ethylene homopolymer; and
C) 30-60% by weight of a terpolymer of ethylene, propylene and 1-butene derived units.

15 Claims, No Drawings

//MIXTURES OF BITUMEN AND POLYMER COMPOSITIONS

This application is the U.S. National Phase of PCT International Application PCT/EP2021/059828, filed Apr. 15, 2021, claiming benefit of priority to European Patent Application No. 20170496.2, filed Apr. 21, 2020, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to mixtures made from or containing bitumen and polymer compositions.

BACKGROUND OF THE INVENTION

In some instances, polymer compositions modify bitumen.

In some instances, the modified bitumen mixtures are used in roofing applications.

SUMMARY OF THE INVENTION

In a general embodiment, the present disclosure provides a mixture made from or containing:
T1) from 99 wt % to 75 wt % of bitumen, and
T2) from 1 wt % to 25 wt % of a polymer composition made from or containing
A) 5-35% by weight of a propylene ethylene copolymer containing 15% by weight or less of a fraction soluble in xylene at 25° C. ($XS_A$), the amount of the fraction $XS_A$ being referred to the weight of A); and from 0.5 wt % to 7.0 wt % of ethylene derived units;
B) 20-50% by weight of an ethylene homopolymer having 5% by weight or less of a fraction soluble in xylene at 25° C. ($XS_B$) referred to the weight of (B); and
C) 30-60% by weight of a terpolymer, wherein the terpolymer contains ethylene, propylene and 1-butene derived units and containing from 45% to 65% by weight of ethylene units and from 15% to 38% by weight of 1-butene units; and containing from 30% to 85% by weight of a fraction soluble in xylene at 25° C. ($XS_C$), the amount of ethylene units, 1-butene units, and the fraction $XS_C$ being referred to the weight of (C);
the amounts of (A), (B) and (C) being referred to the total weight of (A)+(B)+(C), the sum of the amount of (A)+(B)+(C) being 100 wt %;
the amounts, wt %, of T1+T2 being 100 wt %.

DETAILED DESCRIPTION OF THE INVENTION

In some embodiments, the present disclosure provides a mixture made from or containing:
T1) from 99 wt % to 75 wt %; alternatively from 98 wt % to 80 wt %; alternatively from 97 wt % to 90 wt %; alternatively from 97 wt % to 92 wt %; of bitumen; and
T2) from 1 wt % to 25 wt %; alternatively from 2 wt % to 20 wt %; alternatively from 3 wt % to 10 wt %; alternatively from 3 wt % to 8 wt %; of a polymer composition made from or containing;

A) 5-35% by weight; alternatively 10-30% by weight; alternatively 15-23% by weight; of a propylene ethylene copolymer containing 15% by weight or less; alternatively 13 wt % or less; alternatively 10 wt % or less; of a fraction soluble in xylene at 25° C. ($XS_A$), the amount of the fraction $XS_A$ being referred to the weight of A); and from 0.5 wt % to 7.0 wt %; alternatively from 1.0 wt % to 6.0 wt %; alternatively from 1.5 wt % to 4.5 wt %; of ethylene derived units;
B) 20-50% by weight; alternatively 25-45% by weight; alternatively 30-40% by weight; of an ethylene homopolymer having 5% by weight or less; alternatively 4 wt % or less; alternatively 3 wt % or less; of a fraction soluble in xylene at 25° C. ($XS_B$), the amount of the fraction $XS_B$ being referred to the weight of (B); and
C) 30-60% by weight; alternatively 35-55% by weight; alternatively 40-50% by weight; of a terpolymer of ethylene, propylene and 1-butene and containing from 45% to 65% by weight; alternatively from 48% to 62% by weight; alternatively from 50% to 60% by weight; of ethylene units; and from 15% to 38% by weight; alternatively from 18% to 33% by weight; alternatively from 20% to 30% by weight; of 1-butene units; and containing from 30% to 85% by weight; alternatively from 35% to 50% by weight; of a fraction soluble in xylene at 25° C. ($XS_C$), the amount of ethylene units, 1-butene units, and the fraction $XS_C$ being referred to the weight of (C);
the amounts of (A), (B) and (C) being referred to the total weight of (A)+(B)+(C), the sum of the amount of (A)+(B)+(C) being 100 wt %; the amounts, wt %, of T1+T2 being 100 wt %.

In some embodiments, component (A) has a melt flow rate (230° C./2.16 kg) between 50 and 200 g/10 min; alternatively between 80 and 170 g/10 min.

In some embodiments, the ethylene homopolymer (B) contains up to 5% by weight; alternatively up to 3% by weight; of comonomer units. In some embodiments, the comonomer units derive from one or more comonomers selected from $C_3$ to $C_8$ alpha-olefins. In some embodiments, the alpha-olefin comonomers are selected from the group consisting of propylene, butene-1, pentene-1, 4-methylpentene-1, hexene-1, and octene-1. In some embodiments, the alpha-olefin comonomers are selected from the group consisting of propylene and 1-butene. In some embodiments, the ethylene homopolymer (B) does not contain additional comonomer units.

In some embodiments, the ethylene homopolymer (B) has a melt flow rate (230° C./2.16 kg) between 0.1 and 50 g/10 min.; alternatively between 0.1 and 30 g/10 min; alternatively between 0.1 and 10 g/10 min.

In some embodiments, the ethylene homopolymer (B) has a density (determined according to ISO 1183 at 23° C.) of from 0.940 to 0.965 g/cm³.

In some embodiments, components (A)+(B) blended together have a melt flow rate (230° C./2.16 kg) between 0.1 and 70 g/10 min.; alternatively between 1 and 50 g/10 min; alternatively between 8 and 40 g/10 min.

In some embodiments, the polyolefin composition (A)+(B)+(C) has a melt flow rate (230° C./2.16 kg) between 0.5 to 25 g/10 min.; between from 0.8 to 20.0 g/10 min; alternatively from 1.0 to 18.0 g/10 min.

In some embodiments, the xylene soluble fraction at 25° C. of the polyolefin composition (A+B+C) has an intrinsic viscosity [η](measured in tetrahydronaphthalene at 135° C.) between 2.4 and 3.5 dl/g, alternatively between 2.5 and 3.3 dl/g.

As used herein, the term "copolymer" refers to a polymer containing two kinds of comonomers, such as propylene and ethylene or ethylene and 1-butene. As used herein, the term "terpolymer" refers to a polymer containing three kinds of comonomers, such as propylene, ethylene and 1-butene.

In some embodiments, the polyolefin composition is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added in the first step and not in subsequent steps. In some embodiments, the catalyst remains active for the subsequent steps.

In some embodiments, the polymerization is a continuous process. In some embodiments, the polymerization is a batch process. In some embodiments, the polymerization is carried out in liquid phase, in the presence or not of inert diluent, or in gas phase, or by mixed liquid-gas techniques. In some embodiments, the polymerization is carried out in gas phase.

In some embodiments, the temperature for the polymerization steps is from 50 to 100° C. In some embodiments, the pressure for the polymerization steps is atmospheric or higher.

In some embodiments, the molecular weight is regulated. In some embodiments, the molecular weight regulator is hydrogen.

In some embodiments, the polymerizations are carried out in the presence of a Ziegler-Natta catalyst. In some embodiments, a Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on $MgCl_2$.

In some embodiments, the catalysts are made from or containing the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the polymer composition is obtained by using a Ziegler-Natta polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;
2) an aluminum alkyl compound (cocatalyst); and, optionally,
3) an electron-donor compound (external electron-donor).

In some embodiments, the solid catalyst component (1) contains, as electron-donor, a compound selected from the group consisting of ethers, ketones, lactones, compounds containing N, P and/or S atoms, and mono- and dicarboxylic acid esters.

In some embodiments, the catalysts are as described in U.S. Pat. No. 4,399,054 and European Patent No. 45977.

In some embodiments, the electron-donor compounds are selected from the group consisting of phthalic acid esters and succinic acid esters. In some embodiments, the phthalic acid ester is diisobutyl phthalate.

In some embodiments, the succinic acid esters are represented by the formula (I):

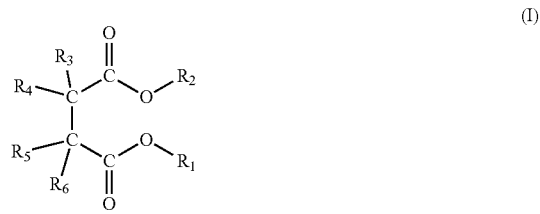

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$ are joined to the same carbon atom and linked together to form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls; alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, $R_3$ and $R_5$ are different from hydrogen and linked to different carbon atoms. In some embodiments, $R_4$ and $R_6$ are different from hydrogen and linked to different carbon atoms.

In some embodiments, the electron-donors are the 1,3-diethers described in European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl, and Al-tri-n-butyl.

In some embodiments, the electron-donor compounds (3) used as external electron-donors (added to the Al-alkyl compound) are selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1{}_aR^2{}_bSi(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, the internal donor is a 1,3-diethers and the external donor is omitted.

In some embodiments, catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

In some embodiment, the bitumen (T1) includes solid, semi-solid or viscous distillation residues of the petroleum refinery process, consisting predominantly of high molecular weight hydrocarbons. In some embodiments, the structure is partially altered. In some embodiments, the structure is altered by oxidation.

In some embodiments, the mixture contains at least one other type of polymer, hereinafter identified as component (T3), in addition to the polymer composition (T2).

In some embodiments, the mixture is made from or containing, as component (T3), one or more olefinic or nonolefinic polymers. In some embodiments, polymers (T3) are selected from the group consisting of amorphous or atactic polymers, styrene-butadiene-styrene (SBS) copolymers, ethylene polyvinyl acetate, low density polyethylene, high density polyethylene, and other polyolefins. In some embodiments, the amorphous polymer is an amorphous polyolefin. In some embodiments, the amorphous polyolefin is amorphous polypropylene. In some embodiments, polymers (T3) are selected from the group consisting of isotactic polypropylene and ethylene-propylene random copolymers.

In some embodiments, the additional polymers (T3) are added in quantities greater than or equal to 0.5%, alternatively from 0.5 to 30%, alternatively from 0.5 to 23%, by weight with respect to the weight of the mixture. In some embodiments, the total quantity of component T2 and T3 (that is, the amount of T2+T3) in the bituminous mixture is less than or equal to 40%, alternatively less than or equal to 25%, by weight with respect to the total weight of the mixture.

In some embodiments and for incorporating the polymer composition (T2) and the other components into the bitumen, the mixing process is carried out at a temperature from 120 to 250° C.; alternatively from 130° C. to 180° C.

In some embodiments, the mixtures are used in the polymer-modified bitumen applications, alternatively for road paving, alternatively for roofing membranes or asphalt.

The following examples are given to illustrate, but not limit the present disclosure.

EXAMPLES

Characterizations
Xylene-Soluble (XS) Fraction at 25° C.
Solubility in xylene: Determined as follows:
2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured into a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components B) and C) were calculated by using the formula:

$$XS_{tot}=WaXS_A+WbXS_B+WcXS_C$$

wherein Wa, Wb and Wc were the relative amount of components A, B and C, respectively, and (A+B+C=1).

Melt Flow Rate (MFR)
Measured according to ISO 1133 at 230° C. with a load of 2.16 kg, unless otherwise specified.

Intrinsic Viscosity (IV)
The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Comonomer ($C_2$ and $C_4$) Content
The content of comonomers was determined by infrared (IR) spectroscopy by collecting the IR spectrum of the sample vs. an air background with a Fourier transform infrared spectrometer (FTIR). The instrument data acquisition parameters were:
purge time: 30 seconds minimum
collect time: 3 minutes minimum
apodization: Happ-Genzel
resolution: 2 cm-1.

Sample Preparation—Using a hydraulic press, a thick sheet was obtained by compression molding about 1 g of sample between two aluminum foil sheets. A small portion was cut from the resulting sheet to mold a film. The film thickness was set to have a maximum absorbance of the CH2 absorption band at ~720 cm-1 of 1.3 a.u. (% Transmittance>5%). The molding conditions were carried out at a temperature of about 180±10° C. (356° F.) and a pressure of about 10 kg/cm2 (142.2 psi) for about one minute. The pressure was then released. The sample was removed from the press and cooled to room temperature. The spectrum of the pressed film sample was recorded as a function of absorbance vs. wavenumbers (cm-1). The following measurements were used to calculate ethylene ($C_2$) and 1-butene ($C_4$) contents:

Area (At) of the combination absorption bands between 4482 and 3950 cm-1, which was used for spectrometric normalization of film thickness.

Area (AC2) of the absorption band due to methylenic sequences (CH2 rocking vibration) in a range of 660-790 cm-1 after a proper digital subtraction of an isotactic polypropylene (IPP) and a $C_2C_4$ references spectrum.

The factor of subtraction (FCRC4) between the spectrum of the polymer sample and the $C_2C_4$ reference spectrum: The reference spectrum was obtained by performing a digital subtraction of a linear polyethylene from a $C_2C_4$ copolymer to extract the $C_4$ band (ethyl group at ~771 cm-1).

The ratio AC2/At was calibrated by analyzing ethylene-propylene standard copolymers of reference compositions, as determined by NMR spectroscopy.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, Macromolecules, 1982, 15, 1150).

To calculate the ethylene ($C_2$) and 1-butene ($C_4$) content, calibration curves were obtained by using reference samples with ethylene and 1-butene that were detectable by 13C NMR.

Calibration for ethylene—A calibration curve was obtained by plotting AC2/At versus ethylene molar percent (% C2m), and the coefficients aC2, bC2 and cC2 were then calculated via linear regression.

Calibration for 1-butene—A calibration curve was obtained by plotting FCRC4/At versus butane molar percent (% C4m), and the coefficients aC4, bC4 and CC4 were then calculated via linear regression.

The spectra of the evaluated samples were recorded and then (At), (AC2) and (FCRC4) were calculated.

The ethylene content (% molar fraction C2m) of the sample was calculated as follows:

$$\% \ C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction C4m) of the sample was calculated as follows:

$$\% \ C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

where aC4, bC4, cC4 aC2, bC2, cC2 were the coefficients of the two calibrations.

Changes from mol % to wt % were calculated by using molecular weights of the compounds.

Amount (wt %) of comonomer of components B-C were calculated by using the following relationship:

$$Com_{tot} = WaCom_A + WbCom_B + WcCom_C$$

wherein Wa, Wb and We were the relative amount of components A, B and C, respectively, and (A+B+C=1). $Com_{tot}$, $Com_A$, $Com_B$ and $Com_C$ were the amounts of comonomer in the total composition (tot) and in components A-C.

Example 1—Preparation of the Polyolefin Composition Component T2

Catalyst Precursor:

The solid catalyst component used in the polymerization was a Ziegler-Natta catalyst component supported on magnesium chloride ($MgCl_2$) containing titanium and diisobutylphthalate as an internal donor. An initial amount of microspheroidal $MgCl_2 \cdot 2.8C_2H_5OH$ was prepared according to Example 2 of U.S. Pat. No. 4,399,054, but operating at 3,000 rpm instead of 10,000 rpm. The resulting adduct was subjected to thermal dealcoholation at increasing temperatures from 30-130° C. in a nitrogen current until the molar alcohol content per mol of Mg was about 1.16. Into a 1000 mL four-necked round flask, purged with nitrogen, 500 mL of $TiCl_4$ were introduced at 0° C. While stirring, 30 grams of the microspheroidal $MgCl_2 \cdot 1.16C_2H_5OH$ adduct were added. The temperature was raised to 120° C. and maintained for 60 minutes. During the temperature increase, an amount of diisobutylphthalate was added to produce a Mg/diisobutylphthalate molar ratio of about 18. After 60 minutes, stirring was stopped, the liquid was siphoned off, and the treatment with TiCl4 was repeated at 100° C. for 1 hour in the presence of an amount of diisobutylphthalate to produce a Mg/diisobutylphthalate molar ratio of about 27. The stirring was then stopped. The liquid siphoned off, and the treatment with $TiCl_4$ was repeated at 100° C. for 30 min. After sedimentation and siphoning at 85° C., the solid was washed six times with anhydrous hexane (6×100 ml) at 60° C.

Catalyst System and Prepolymerization:

Before introducing the solid catalyst component into the polymerization reactors, the solid catalyst component was contacted at 30° C. for 9 minutes with aluminum triethyl (TEAL) and dicyclopentyldimethoxysilane (DCPMS) at a TEAL/DCPMS weight ratio of about 15 and in such a quantity that the TEAL/solid catalyst component weight ratio was about 4.

The catalyst system was then subjected to prepolymerization by maintaining the catalyst system in a liquid propylene suspension at 50° C. for about 75 minutes before introducing the catalyst system into the first polymerization reactor.

Polymerization

The polymerization was carried out in continuous mode in a series of three gas-phase reactors equipped with devices to transfer the product from the first reactor to the second reactor. A propylene-based polymer (A) was produced in the first gas phase polymerization reactor by feeding the prepolymerized catalyst system, hydrogen (the molecular weight regulator), and propylene, with the components in the gas state, in a continuous and constant flow. The propylene-based polymer (A) coming from the first reactor was discharged in a continuous flow and, after having been purged of unreacted monomers, introduced, in a continuous flow, into the second gas phase reactor, together with quantitatively constant flows of hydrogen and ethylene, with the components in a gas state. In the second reactor a copolymer of ethylene (B) was produced. The product coming from the second reactor was discharged in a continuous flow and, after having been purged of unreacted monomers, introduced, in a continuous flow, into the third gas phase reactor, together with quantitatively constant flows of hydrogen, ethylene, and propylene, with the components in a gas state. In the third reactor, an ethylene-propylene polymer (C) was produced. Polymerization conditions, molar ratio of the reactants and compositions of the resulting copolymers are shown in Table 1. The polymer particles exiting the third reactor were subjected to a steam treatment to remove the reactive monomers and volatile substances and then dried. Thereafter, the polymer particles were mixed with a stabilizing additive composition in a twin screw extruder Berstorff ZE 25 (length/diameter ratio of screws: 34) and extruded under a nitrogen atmosphere in the following conditions:

Rotation speed: 250 rpm;
Extruder output: 15 kg/hour;
Melt temperature: 245° C.

The stabilizing additive composition was made from or containing the following components:

0.1% by weight of Irganox® 1010;
0.1% by weight of Irgafos® 168; and
0.04% by weight of DHT-4A (hydrotalcite);

where the percentage amounts refer to the total weight of the polymer and stabilizing additive composition.

Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, and Irgafos® 168 was tris(2,4-di-tert.-butylphenyl)phosphite. The characteristics of the polymer composition, reported in Table 2, were obtained from measurements carried out on the extruded polymer, which constituted the stabilized ethylene polymer composition.

TABLE 1

Polymerization conditions

| Example | | Ex 1 | Comp. 2 |
|---|---|---|---|
| 1st Reactor - component (A) | | | |
| Temperature | ° C. | 60 | 60 |
| Pressure | barg | 16 | 16 |
| $H_2/C_3-$ | mol. | 0.27 | 0.24 |
| Split | wt % | 22 | 22 |
| Xylene soluble of (A) ($XS_A$) | wt % | 0.94 | 4.2 |
| 2nd Reactor - component (B) | | 9.3 | |
| Temperature | ° C. | | 80 |
| Pressure | barg | 80 | 18 |
| $H_2/C_2-$ | mol. | 18 | 0.81 |
| $C_4-/(C_2- + C_4-)$ | mol. | 0.69 | 0.25 |
| $C_2-/(C_2- + C_3-)$ | mol. | 0.96 | 0.98 |
| Split | wt % | 30 | 32 |
| 3rd Reactor - component (C) | | | |
| Temperature | ° C. | 60 | 65 |
| Pressure | barg | 14 | 18 |
| $H_2/C_2-$ | mol. | 0.11 | 0.17 |
| $C_3-/(C_2- + C_3-)$ | mol. | 0.44 | 0.42 |
| $C_4-/(C_2- + C_4-)$ | | 0.37 | 0 |
| Split | wt % | 48 | 46 |

Notes:
$C_2-$ = ethylene (IR); $C_3-$ = propylene (IR); $C_4-$ = 1-butene (IR); split = amount of polymer produced in the concerned reactor.
* Calculated values.

The features of the polymer of Example 1 and comparative example 2 are reported in Table 2.

TABLE 2

| Example | | Ex 1 | Comp 2 |
|---|---|---|---|
| component A | | | |
| $C_2$ content | wt % | 3.0 | 0 |
| XSA | wt % | 9.3 | 4.6 |
| MFR | g/10 min | 110 | 110 |
| split | wt % | 22 | 20 |
| component B | | | |
| XSB* | wt % | 1.7 | 16.0 |
| $C_2$ content* | wt % | 100 | 90 |
| $C_4$ content* | wt % | 30 | 10 |
| split | wt % | 35 | 32 |
| MFR | g/10 min | | 35.9 |
| Component C | | 42.0 | |
| XSC* | wt % | 54.8 | 83 |
| $C_2$ content* | wt % | 24.0 | 52 |
| $C_4$ content* | wt % | 48 | 0 |
| split | wt % | | 46 |
| total composition | | 2.0 | |
| MFR | g/10 min | 2.79 | 1.6 |
| IV on soluble in Xylene at 25° C. | dl/g | | 2.4 |

$C_2$ = ethylene;
$C_4$ = 1-butene;
*calculated

Bitumen from the Polymer of Example 1 and Comparative Example 2

The polymer of example 1 and comparative example 2 were blended with bitumen. The blends contained 5% of the polymers of example 1 (T2) and comparative example 2 (T2) and 95% of bitumen (T1). The two compositions were marked as B1 and B2. The characterization of the two compositions is reported in Table 3.

TABLE 3

| | method | Bitumen | Ex 1 | Comp Ex 2 |
|---|---|---|---|---|
| R&B ° C. | | 43 | 60 | 80 |
| PEN (dmm) | | 77 | 42 | 48 |
| Fraass (° C.) | | −3 | −4 | −4 |

The properties of the polymer composition/bitumen mixtures were determined as follows.

| Property | Method |
|---|---|
| Ring & Ball (R&B): | EN 1427: 2015; |
| Penetration: | EN 1426: 2015; |
| Fraass | EN 12593: 2015. |

What is claimed is:
1. A mixture consisting of:
T1) from 99 wt % to 75 wt % of bitumen, and
T2) from 1 wt % to 25 wt % of a polymer composition comprising
A) 5-35% by weight of a propylene ethylene copolymer containing 15% by weight or less of a fraction soluble in xylene at 25° C. ($XS_A$), the amount of the fraction $XS_A$ being referred to the weight of A); and from 0.5 wt % to 7.0 wt % of ethylene derived units;
B) 20-50% by weight of an ethylene homopolymer having 5% by weight or less of a fraction soluble in xylene at 25° C. ($XS_B$) referred to the weight of (B); and
C) 30-60% by weight of a terpolymer of ethylene, propylene and 1-butene derived units and containing from 45% to 65% by weight of ethylene units; and from 15% to 38% by weight of 1-butene units; and containing from 30% to 85% by weight of a fraction soluble in xylene at 25° C. ($XS_C$), the amount of ethylene units, 1-butene units, and the fraction $XS_C$ being referred to the weight of (C);

the amounts of (A), (B) and (C) being referred to the total weight of (A)+(B)+(C), the sum of the amount of (A)+(B)+(C) being 100 wt %; the amounts, wt %, of T1+T2 being 100 wt %.

2. The mixture according to claim 1, wherein, in component T2),

Component A ranges from 10% by weight to 30% by weight;
Component B ranges from 25% by weight to 45% by weight; and
Component C ranges from 35% by weight to 55% by weight.

3. The mixture according to claim 1, wherein, in component T2),

Component A ranges from 15% by weight to 23% by weight;
Component B ranges from 30% by weight to 40% by weight; and
Component C ranges from 40% by weight to 50% by weight.

4. The mixture according to claim 1, wherein, in component T2), component A) has the fraction soluble in xylene at 25° C. ($XS_A$) of 13 wt % or less.

5. The mixture according to claim 1, wherein, in component T2), component B) is an ethylene homopolymer having 4 wt % or less of a fraction soluble in xylene at 25° C. ($XS_B$).

6. The mixture according to claim 1, wherein, in component T2), component C) is terpolymer of ethylene, propylene and 1-butene containing from 48% to 62% by weight of ethylene units; and from 18% to 33% by weight of 1-butene units.

7. The mixture according to claim 1, wherein, in component T2), component (A) has a melt flow rate (230° C./2.16 kg) between 50 and 200 g/10 min.

8. The mixture according to claim 1, wherein, in component T2), component (B) has a melt flow rate (230° C./2.16 kg) between 0.1 and 50 g/10 min.

9. The mixture according to claim 1, wherein, in component T2), component (A) has a melt flow rate (230° C./2.16 kg) between 80 and 170 g/10 min.

10. The mixture according to claim 1, wherein, in component T2), component (B) has a melt flow rate (230° C./2.16 kg) ranging between 0.1 and 30 g/10 min.

11. The mixture according to claim 1, wherein, in component T2), the ethylene homopolymer component (B) has a density (determined according to ISO 1183 at 23° C.) of from 0.940 to 0.965 g/cm³.

12. The mixture according to claim 1, wherein component T2) has a melt flow rate (230° C./2.16 kg) between from 0.8 to 20.0 g/10 min.

13. The mixture according to claim 1, wherein T1 ranges from 98 wt % to 80 wt %; and T2 ranges from 2 wt % to 20 wt %.

14. The mixture according to claim 1, wherein T1 ranges from 97 wt % to 90 wt %; and T2 ranges from 3 wt % to 10 wt %.

15. The mixture according to claim 1, wherein T1 ranges from 97 wt % to 92 wt %; and T2 ranges from 3 wt % to 8 wt %.

\* \* \* \* \*